United States Patent
Gao et al.

(10) Patent No.: US 11,416,994 B2
(45) Date of Patent: Aug. 16, 2022

(54) METHOD AND SYSTEM FOR DETECTING CHEST X-RAY THORACIC DISEASES UTILIZING MULTI-VIEW MULTI-SCALE LEARNING

(71) Applicant: CURACLOUD CORPORATION, Seattle, WA (US)

(72) Inventors: Feng Gao, Seattle, WA (US); Hao-Yu Yang, Seattle, WA (US); Youbing Yin, Kenmore, WA (US); Yue Pan, Seattle, WA (US); Xin Wang, Seattle, WA (US); Junjie Bai, Seattle, WA (US); Yi Wu, Seattle, WA (US); Kunlin Cao, Kenmore, WA (US); Qi Song, Seattle, WA (US)

(73) Assignee: KEYAMED NA, INC., Seattle, WA (US)

(*) Notice: Subject to any disclaimer, the term of this patent is extended or adjusted under 35 U.S.C. 154(b) by 45 days.

(21) Appl. No.: 16/862,462

(22) Filed: Apr. 29, 2020

(65) Prior Publication Data

US 2020/0349706 A1    Nov. 5, 2020

Related U.S. Application Data

(60) Provisional application No. 62/843,510, filed on May 5, 2019.

(51) Int. Cl.
*G06T 7/00* (2017.01)

(52) U.S. Cl.
CPC ................ *G06T 7/0014* (2013.01)

(58) Field of Classification Search
CPC ..................................... G06T 7/0014
USPC ........................................ 382/132
See application file for complete search history.

(56) References Cited

U.S. PATENT DOCUMENTS

| 10,223,610 B1* | 3/2019 | Akselrod-Ballin |
| 2001/0026637 A1* | 10/2001 | Lelong |
| 2005/0084178 A1* | 4/2005 | Lure |
| 2021/0027107 A1* | 1/2021 | Pekelny |

FOREIGN PATENT DOCUMENTS

| CN | 108694469 A | * | 10/2018 |
| CN | 109740539 A | * | 5/2019 |

* cited by examiner

*Primary Examiner* — Wednel Cadeau
(74) *Attorney, Agent, or Firm* — Bayes PLLC (57) ABSTRACT

Embodiments of the disclosure provide systems and methods for biomedical image analysis. A method may include receiving a plurality of unannotated biomedical images, including a first image and a second image. The method may also include determining that the first image is in a first view and the second image is in a second view. The method may further include assigning the first image to a first processing path for the first orientation. The method may additionally include assigning the second image to a second processing path for the second view. The method may also include processing the first image in the first processing path in parallel with processing the second image in the second processing path. The first path may share processing parameters with the second path. The method may further include providing a diagnostic output based on the processing of the first image and the second image.

16 Claims, 6 Drawing Sheets

METHOD AND SYSTEM FOR DETECTING CHEST X-RAY THORACIC DISEASES UTILIZING MULTI-VIEW MULTI-SCALE LEARNING

CROSS-REFERENCE TO RELATED APPLICATION

This application claims the benefit of priority to U.S. Provisional Application No. 62/843,510, filed on May 5, 2019, the entire content of which is incorporated herein by reference.

TECHNICAL FIELD

The present disclosure relates to systems and methods for detecting diseases from x-ray images, and more particularly to detecting thoracic diseases and other findings in chest x-ray images using multi-view, multi-scale learning.

BACKGROUND

Over 2 billion chest x-rays are taken annually. Chest x-rays are typically the first screen to diagnose cardiopulmonary conditions such as cardiomegaly, edema, pneumonia, pneumothorax, and the like. Chest x-rays also have diagnostic value in identifying the progression of SARS-COV-2 also known as COVID-19. Several factors impact the interpretation of chest x-rays. Pathological features may share similar attributes in chest radiographs. The two-dimensional nature of the modality of chest x-rays produces images with overlapping anatomical structures, which may result in erroneous readings. Incorrect interpretation of chest radiographs is aggravated by the shortage of radiologists and increased workload worldwide, particularly during times of pandemic or widespread experience of symptoms of viral pneumonia.

Computer-aided diagnostic (CAD) systems have been proposed to mitigate heavy workloads and improve clinical decisions of radiologists. The rapid development of deep learning in recent years has led to a growing interest in utilizing deep neural networks (DNN) in CAD systems. While demonstrating state-of-the-art performance across numerous computer vision tasks, several challenges remain before DNN can be applied in clinical settings. First, projecting chest radiographs lacks spatial resolution in the third dimensional compared to a volumetric modality such as computed tomography. Second, thoracic diseases demonstrate highly varying affected region(s). Without localized information, a CAD system could mistake unrelating features as factors contributing to disease. Furthermore, it is difficult to assess the performance of the model without knowing the regions that the system suspects of findings.

Embodiments of the disclosure address the above problems by methods and systems for detecting chest x-ray thoracic diseases utilizing, for example, multi-view and multi-scale learning.

SUMMARY

Novel systems and methods for detecting diseases from x-ray images, and more particularly for detecting thoracic diseases and other findings in chest x-ray images using multi-view, multi-scale learning are disclosed.

In one aspect, embodiments of the disclosure provide a system for biomedical image analysis. The system may include a communication interface configured to receive a plurality of unannotated biomedical images, the biomedical images including a first image and a second image being acquired in a pair by an image acquisition device. The system may also include at least one processor configured to determine that the first image is in a first view and the second image is in a second view. The at least processor may also be configured to assign the first image of the plurality of unannotated biomedical images to a first processing path including a first set of processing modules designed for the first orientation. The at least processor may further be configured to assign the second image of the plurality of unannotated biomedical images to a second processing path including a second set of processing modules designed for the second view. The at least processor may additionally be configured to process the first image in the first processing path in parallel with processing the second image in the second processing path. The first set of processing modules may share processing parameters with the second set of processing modules. The at least processor may also be configured to provide a diagnostic output based on the processing of the first image and the second image.

In another aspect, embodiments of the disclosure also provide a method for biomedical image analysis. The method may include receiving, at a communication interface, a plurality of unannotated biomedical images, the biomedical images including a first image and a second image being acquired in a pair by an image acquisition device. The method may also include determining, by at least one processor, that the first image is in a first view and the second image is in a second view. The method may further include assigning, by the at least one processor, the first image of the plurality of unannotated biomedical images to a first processing path including a first set of processing modules designed for the first orientation. The method may additionally include assigning, by the at least one processor, the second image of the plurality of unannotated biomedical images to a second processing path including a second set of processing modules designed for the second view. The method may also include processing, by the at least one processor, the first image in the first processing path in parallel with processing the second image in the second processing path. The first set of processing modules share processing parameters with the second set of processing modules. The method may further include providing, by the at least one processor, a diagnostic output based on the processing of the first image and the second image.

In yet another aspect, embodiments of the disclosure further provide a non-transitory computer-readable medium having a computer program stored thereon. The computer program, when executed by at least one processor, performs a method for biomedical image analysis. The method may include receiving a plurality of unannotated biomedical images, the biomedical images including a first image and a second image being acquired in a pair by an image acquisition device. The method may also include determining that the first image is in a first view and the second image is in a second view. The method may further include assigning the first image of the plurality of unannotated biomedical images to a first processing path including a first set of processing modules designed for the first orientation. The method may additionally include assigning the second image of the plurality of unannotated biomedical images to a second processing path including a second set of processing modules designed for the second view. The method may further include processing the first image in the first processing path in parallel with processing the second image in the second processing path, wherein the first set of processing modules share processing parameters with the second set of processing modules. The method may also include providing a diagnostic output based on the processing of the first image and the second image.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings.

CAD systems may mitigate heavy workloads and improve clinical decisions of radiologists. DNN may be applied to CAD systems. DNN in clinical settings face obstacles or challenges that may be addressed, mitigated, or overcome by certain embodiments of the present disclosure. Conventional two-dimensional chest radiographs lack spatial resolution in the third dimension, in contrast to volumetric modalities such as computed tomography. Thus, structures in the viewing direction in front of or behind a lesion or other target of interest may obscure a view of the lesion (or other target).

Figure 1A:
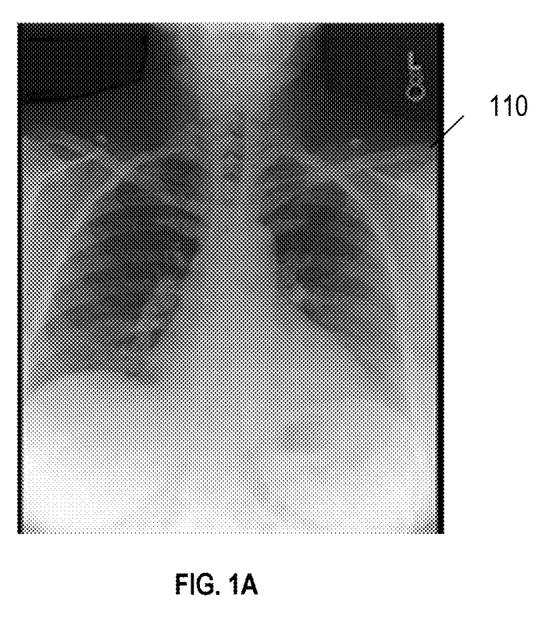
FIG. 1A illustrates an example of a frontal view chest x-ray.
Figure 1B:
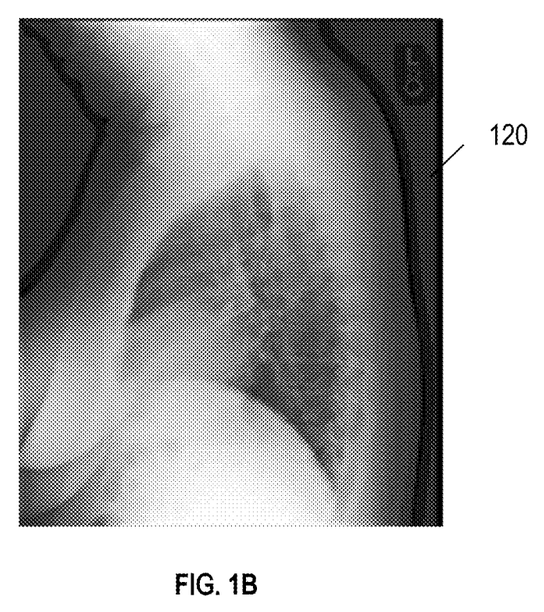
FIG. 1B illustrates an example of a lateral view chest x-ray corresponding to the frontal view of FIG. 1A.

To obtain a differently obscured (or unobscured) view of a lesion, additional lateral chest x-rays may be performed. FIGS. 1A and 1B respectively illustrate an example of a frontal view chest x-ray 110 (FIG. 1A) and a corresponding lateral view chest x-ray 120 (FIG. 1B). Although only a pair of x-rays 110, 120 are shown, additional x-ray images may be taken. For example, the pair of x-rays 110, 120 shown are taken with a rotation of 90 degrees between them, but multiple x-rays with different rotational offsets may be used. Certain embodiments of a CAD system according to the present disclosure may consider images from both or all orientations. For ease of illustration, the following discussion focuses on an example of pairs of images with orthogonal rotations around the vertical axis, namely a frontal plane image (frontal chest x-ray 110 is an example) and a sagittal plane image (lateral view chest x-ray 120 is an example).

The affected region of the chest may have significant variation in at least two ways: different thoracic diseases may affect different areas of the chest as compared to other thoracic diseases, and a single thoracic disease may affect many areas of the chest. Without localized information, a CAD system could mistake unrelated features as factors contributing to a disease. Likewise, in reviewing results of the CAD system, it may be difficult to assess the performance of a CAD model without knowing the regions that the system suspects of findings.

Certain embodiments of the present disclosure relate to a computer vision system that integrates chest x-ray images taken from different views and outputs probabilities of one or more diseases and other findings by utilizing global and local information in multi-scale, with an option to display bounding boxes indicative of the disease. This approach, in various embodiments, may provide informative coordinates of findings and may eliminate potential errors from missing or inaccurate meta information.

Certain embodiments of the present disclosure relate to a fully-automated chest x-ray interpretation system that may perform a sequence of closely-associated tasks. Inputs to the system may be annotated or unannotated diagnostic images, such as chest x-ray images and the outputs may be probabilities of diseases and/or other findings. Thoracic diseases to be diagnosed include but are not limited to pneumothorax, atelectasis, pneumonia, cardiomegaly, COVID-19, etc. Examples of anatomical structures and findings are cardiac boarders, hilar structures, thoracic aortas, lung lobes, support devices (for example, pacemakers), and foreign objects (for example, shrapnel).

Associated image taken from different views may be available and offer important information that can improve the diagnosis. For example, lesions in the thoracic cavity may be visible to human readers from only one view, but subtle symptoms from the other view may be identified using a CAD system. In some embodiments of the present disclosure, two view images may be combined and input into one learning task, which may improve detection sensitivity and specificity. Likewise, in some embodiments, three or more images may be similarly combined to provide additional benefit.

Certain embodiments of the present disclosure may also identify the respective views (also referred to as the orientations) of the images without relying on the view information documented in some metadata. While some Picture Archiving and Communication Systems (PACS) provide the orientation of the images in the form of metadata, the quality of this metadata may be inconsistent and may depend on the training of the human operators of the systems. The result may be that chest x-rays may have inaccurate or missing information in the metadata.

Some embodiments of the present disclosure also include automated segmentation or other localization to avoid issues, such as overfitting. For example, irrelevant information may inadvertently be associated with diseases.

Certain embodiments of the present disclosure integrate a variety of modules to form, for example, an end-to-end chest x-ray interpretation system. As discussed in greater detail below, these modules may include the following: a view recognition module, a multi-scale localization module, an image classification module, and a joint prediction module. To address alternating orientation issues or possible metadata errors (or for other reasons), the view recognition module (sometimes also referred to as a multi-view module) may automatically detect the orientation of the images without the need for additional meta information. The multi-scale localization module may identify regions of interest on different levels of granularity and provide the image classification module with distilled information.

Certain embodiments may perform a type of multi-tasking in a way that may be beneficial or otherwise advantageous. By performing a series of closely-related tasks in parallel paths, a significant number of redundant parameters can be reduced. In some embodiments, the parallel paths may share learning parameters to take advantage of the correlation between or among the different image views of the same underlying subject.

Certain embodiments may provide accuracy improvement compared to previous approaches or approaches without certain aspects of the present disclosure. Incorporating two or more images from two or more viewpoints with both global and localized information may provide superior prediction accuracy compared to prediction based on a single-view and/or prediction based on a whole image without localization.

Certain embodiments may provide flexibility. In certain embodiments of the present disclosure, there are no limitations on the maximum number of images, the maximum number of different views and so on. Additionally, the multi-scale localization module may be used for a variety of tasks including anatomical structure segmentation and disease detection.

Figure 2:
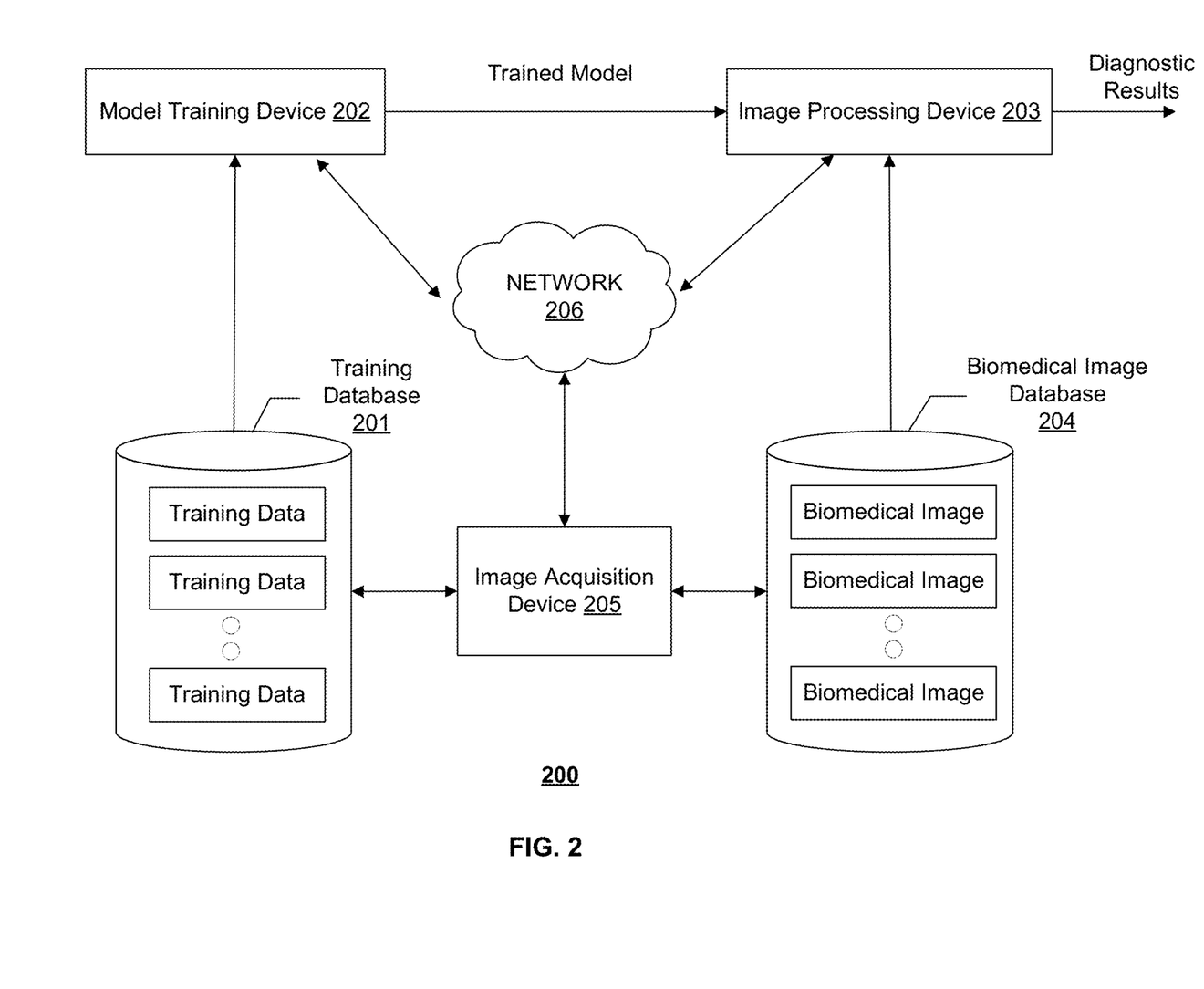
FIG. 2 illustrates a schematic diagram of an exemplary diagnostic image analysis system, according to certain embodiments of the disclosure.

FIG. 2 illustrates an exemplary diagnostic image analysis system 200, according to some embodiments of the present disclosure. Diagnostic image analysis system 200 may be considered a specific example of a localization module. Consistent with the present disclosure, diagnostic image analysis system 200 may be configured to analyze a biomedical image acquired by an image acquisition device 205 and perform a diagnostic prediction based on the image analysis. In some embodiments, image acquisition device 205 may be using one or more imaging modalities, including, e.g., Magnetic Resonance Imaging (MRI), Computed Tomography (CT), functional MRI (e.g., fMRI, DCE-MRI and diffusion MRI), Positron Emission Tomography (PET), Single-Photon Emission Computed Tomography (SPECT), X-ray, Optical Coherence Tomography (OCT), fluorescence imaging, ultrasound imaging, radiotherapy portal imaging, or the like.

In some embodiments, image acquisition device 205 may capture images containing at least one anatomical structure or organ, such as a lung or a thorax. For example, image acquisition device 205 may be an X-ray machine that captures thoracic x-ray images. Other examples may be machines that capture 2D images of anatomical features or 2D plus depth images of anatomical features.

As shown in FIG. 2, diagnostic image analysis system 200 may include components for performing two phases, a training phase and a prediction phase. The prediction phase may also be referred to as an inference phase. To perform the training phase, diagnostic image analysis system 200 may include a training database 201 and a model training device 202. To perform the prediction phase, diagnostic image analysis system 200 may include an image processing device 203 and a biomedical image database 204. In some embodiments, diagnostic image analysis system 200 may include more or less of the components shown in FIG. 2. For example, when a diagnosis model for providing a diagnostic prediction based on the biomedical images is pre-trained and provided, diagnostic image analysis system 200 may include only image processing device 203 and biomedical image database 204.

Diagnostic image analysis system 200 may optionally include a network 206 to facilitate the communication among the various components of diagnostic image analysis system 200, such as databases 201 and 204, devices 202, 203, and 205. For example, network 206 may be a local area network (LAN), a wireless network, a cloud computing environment (e.g., software as a service, platform as a service, infrastructure as a service), a client-server, a wide area network (WAN), etc. In some embodiments, network 206 may be replaced by wired data communication systems or devices.

In some embodiments, the various components of diagnostic image analysis system 200 may be remote from each other or in different locations, and be connected through network 206 as shown in FIG. 2. In some alternative embodiments, certain components of diagnostic image analysis system 200 may be located on the same site or inside one device. For example, training database 201 may be located on-site with or be part of model training device 202. As another example, model training device 202 and image processing device 203 may be inside the same computer or processing device.

Model training device 202 may use the training data received from training database 201 to train a diagnosis model for analyzing a biomedical image received from, e.g., biomedical image database 204, in order to provide a diagnostic prediction. As shown in FIG. 2, model training device 202 may communicate with training database 201 to receive one or more sets of training data. In certain embodiments, each set of training data may include ground truth multi-scale bounding boxes and diseases/findings probabilities.

Training images stored in training database 201 may be obtained from a biomedical image database containing previously acquired images of anatomical structures. In some embodiments, the biomedical image may be processed by model training device 202 to identify specific diseases, anatomical structures, support structures, and other items. The prediction results are compared with an initial diseases/finding probability analysis, and based on the difference, the model parameters are improved/optimized by model training device 202. For example, an initial diseases/findings probability analysis may be performed and verified by experts.

In some embodiments, the training phase may be performed "online" or "offline." An "online" training refers to performing the training phase contemporarily with the prediction phase, e.g., learning the model in real-time just prior to analyzing a biomedical image. An "online" training may have the benefit to obtain a most updated learning model based on the training data that is then available. However, an "online" training may be computational costive to perform and may not always be possible if the training data is large and/or the model is complicate. Consistent with the present disclosure, an "offline" training is used where the training phase is performed separately from the prediction phase. The learned model trained offline is saved and reused for analyzing images.

Model training device 202 may be implemented with hardware specially programmed by software that performs the training process. For example, model training device 202 may include a processor and a non-transitory computer-readable medium (discussed in detail in connection with FIG. 3). The processor may conduct the training by performing instructions of a training process stored in the computer-readable medium. Model training device 202 may additionally include input and output interfaces to communicate with training database 201, network 206, and/or a user interface (not shown). The user interface may be used for selecting sets of training data, adjusting one or more parameters of the training process, selecting or modifying a framework of the learning model, and/or manually or semi-automatically providing prediction results associated with an image for training.

Consistent with some embodiments, the diagnosis model may include a variety of modules arranged in series and in parallel. For example, as will be shown in FIG. 4, view recognition model 410 may be in series with other modules, while multi-scale localization modules 420a, 420b may be in parallel with one another. These modules may be variously implemented using convolutional networks. For example, each module may be a convolutional network or set of convolutional networks.

Returning to FIG. 2, the trained diagnosis model may be used by image processing device to analyze new biomedical images for diagnosis purpose. Image processing device 203 may receive the diagnosis model, e.g., end-to-end learning model 400, from model training device 202. Image processing device 203 may include a processor and a non-transitory computer-readable medium (discussed in detail in connection with FIG. 3). The processor may perform instructions of a medical diagnostic image analysis program stored in the medium. Image processing device 203 may additionally include input and output interfaces (discussed in detail in connection with FIG. 3) to communicate with biomedical image database 204, network 206, and/or a user interface (not shown). The user interface may be used for selecting biomedical images for analysis, initiating the analysis process, displaying the diagnostic results.

Image processing device 203 may communicate with biomedical image database 204 to receive biomedical images. In some embodiments, the biomedical images stored in biomedical image database 204 may include two or more image views acquired in pairs from the same underlying subject. The biomedical images may be acquired by image acquisition devices 205. Image processing device 203 may perform an initial view recognition of the images to sort them according to the views. Each group of sorted images may be assigned to a different processing path. In each processing path, image processing device 230 may perform a localization (e.g., through bounding boxes or image segmentation) to locate a rough profile of a lesion or anatomical structure. Based on the initial localization, image processing device 203 then makes further classifications to generate feature maps based on the localized data, and perform diagnostic predications using the feature maps.

Figure 3:
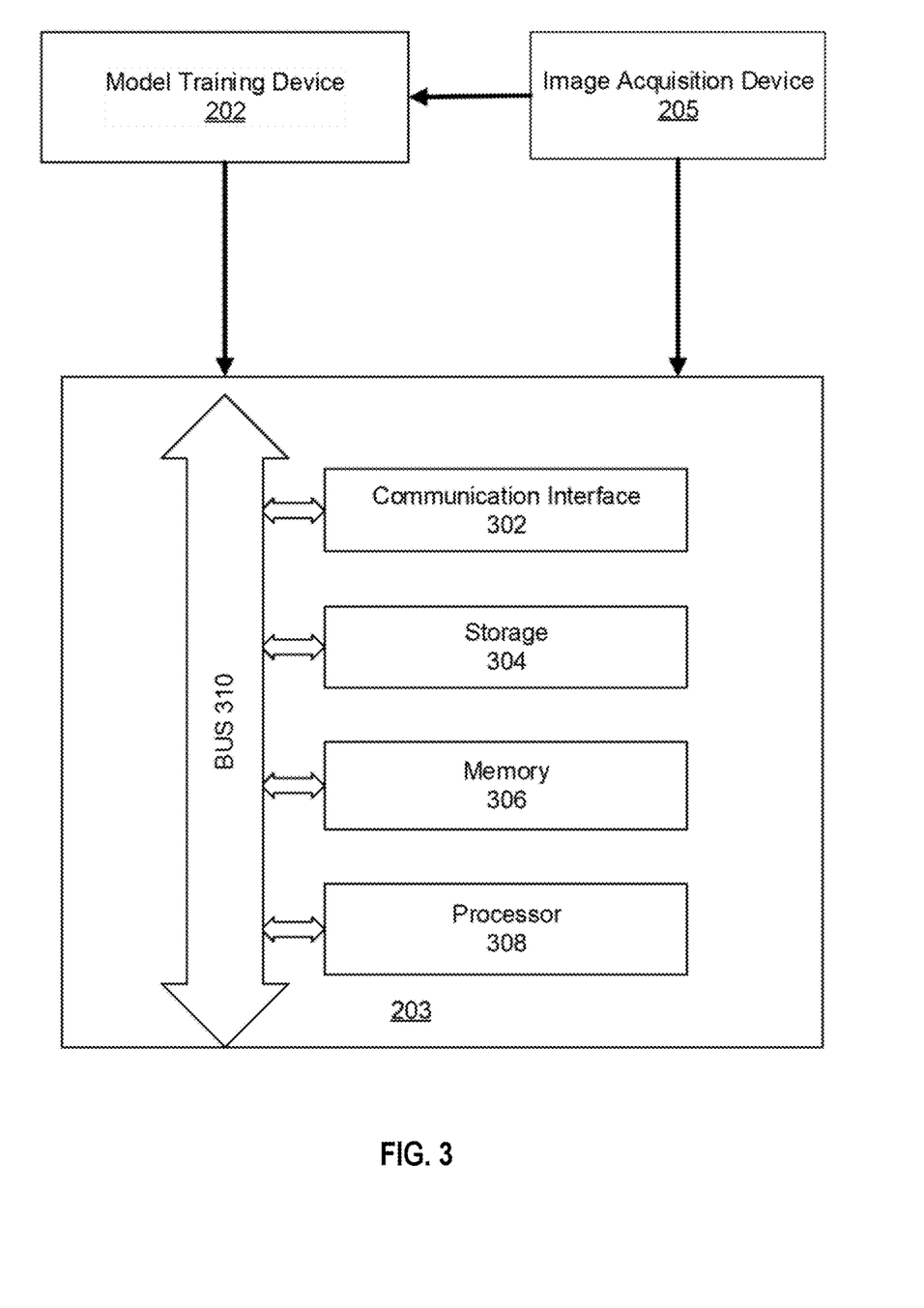
FIG. 3 illustrates a schematic diagram of an image processing device, according to certain embodiments of the disclosure.

Systems and methods mentioned in the present disclosure may be implemented using a computer system, such as shown in FIG. 3. In some embodiments, image processing device 203 may be a dedicated device or a general-purpose device. For example, the image processing device 203 may be a computer customized for a hospital for processing image data acquisition and image data processing tasks, or a server in a cloud environment. The image processing device 203 may include one or more processor(s) 308 and one or more storage device(s) 304. The processor(s) 308 and the storage device(s) 304 may be configured in a centralized or a distributed manner. The image processing device 203 may also include a medical database (optionally stored in storage 304 or in a remote storage), an input/output device (not shown, but which may include a touch screen, keyboard, mouse, speakers/microphone, or the like), a network interface such as communication interface 302, a display (not shown, but which may be a cathode ray tube (CRT) or liquid crystal display (LCD) or the like), and other accessories or peripheral devices. The various elements of image processing device 203 may be connected by a bus 310, which may be a physical and/or logical bus in a computing device or among computing devices.

The processor 308 may be a processing device that includes one or more general processing devices, such as a microprocessor, a central processing unit (CPU), a graphics processing unit (GPU), and the like. More specifically, the processor 308 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor 308 may also be one or more dedicated processing devices such as application specific integrated circuits (ASICs), field programmable gate arrays (FPGAs), digital signal processors (DSPs), system-on-chip (SoCs), and the like.

The processor 308 may be communicatively coupled to the storage device 304 and configured to execute computer-executable instructions stored therein. For example, as illustrated in FIG. 3, a bus 310 may be used, although a logical or physical star or ring topology would be examples of other acceptable communication topologies. The storage device 304 may include a read only memory (ROM), a flash memory, random access memory (RAM), a static memory, a volatile or non-volatile, magnetic, semiconductor, tape, optical, removable, nonremovable, or other type of storage device or tangible (e.g., non-transitory) computer readable medium. In some embodiments, the storage device 304 may store computer-executable instructions of one or more processing programs and data generated when a computer program is executed. The processor may execute the processing program to implement each step of the methods described below. The processor may also send/receive medical data to/from the storage device.

The image processing device 203 may also include one or more digital and/or analog communication (input/output) devices, not illustrated in FIG. 3. For example, the input/output device may include a keyboard and a mouse or trackball that allow a user to provide input. The image processing device 203 may further include a network interface, illustrated as communication interface 302, such as a network adapter, a cable connector, a serial connector, a USB connector, a parallel connector, a high-speed data transmission adapter such as optical fiber, USB 3.0, lightning, a wireless network adapter such as a WiFi adapter, or a telecommunication (3G, 4G/LTE, etc.) adapter and the like. The image processing device 203 may be connected to a network through the network interface. The image processing device 203 may further include a display, as mentioned above. In some embodiments, the display may be any display device suitable for displaying a medical image and its segmentation results. For example, the image display may be an LCD, a CRT, or an LED display.

The image processing device 203 may be connected to model training device 202 and image acquisition device 205 as discussed above with reference to FIG. 2. Other implementations are also possible.

Figure 4:
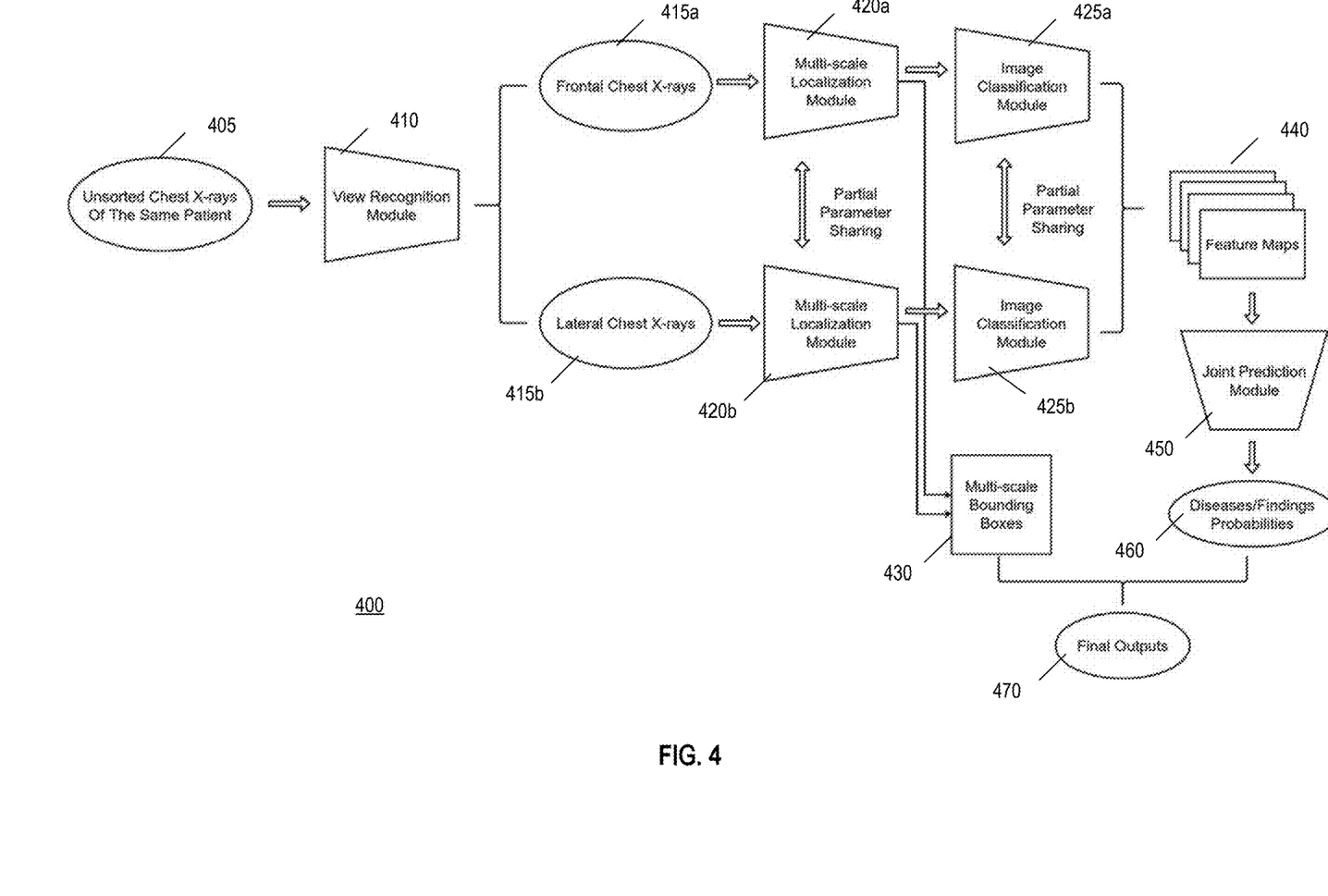
FIG. 4 illustrates a schematic overview of workflow performed by the diagnostic image analysis system according to certain embodiments of the present disclosure.

FIG. 4 illustrates a schematic overview of workflow performed by the diagnostic image analysis system according to certain embodiments of the present disclosure. As shown in FIG. 4, input images, such as unsorted chest x-ray images 405 of a same patient, may be processed sequentially and in parallel by a group of modules, as discussed in detail below, to yield final outputs 470, which may be presented in a human readable format as one or more displayed images and text or in other formats, such as in a computer-readable format suitable for transmission to a further device. The details of each module are discussed in the following sections.

Certain embodiments employ deep learning or other machine learning techniques. For example, certain embodiments may have a two-stage implementation. In a first stage, there may be a training phase to train an end-to-end learning model 400. In a second stage, there may be an inference phase to make diagnostic predictions using the trained end-to-end learning model 400.

The training phase can refer to the process of tuning model parameters to fit the training data. The inputs of the training procedure may be raw chest x-ray images and corresponding labels. In some embodiments, end-to-end learning model 400 may include various modules including a view recognition module 410, multi-scale location modules 420a and 420b each in a processing path, image classification modules 425a and 425b each in the processing path, and a joint prediction module 450. In particular, additional localization information can be provided and utilized by multi-scale localization modules of the learning model. Such localization information can include, for example, the following: (1) bounding boxes of the locations of the diseases/findings; (2) bounding boxes of other task-related regions such as the lungs; or (3) segmentation masks instead of bounding boxes. Chest cavity findings and thoracic diseases are not mutually exclusive. A multi-label paradigm, where each image can have multiple labels, can be implemented in certain embodiments.

The inference phase can refer to a stage after training is deemed complete or sufficiently extensive. At the inference phase, inputs to the trained end-to-end learning model 400 may be multiple chest x-ray images from one patient (for example, unsorted chest x-rays 405 in FIG. 4), which may correspond to multiple viewpoints acquired during one or multiple examinations. The outputs of the model may include patient-wise diseases/findings probabilities 460 included in the final outputs 470. Local information, such as multi-scale bounding boxes 430 of task-related regions, can also be output for visualization purposes as part of the final outputs 470.

In some embodiments, the various modules end-to-end learning model 400 may be separately and individually implemented as various central processing units (CPUs), graphics processing units (GPUs), or by various threads running on individual cores of the same CPU or GPU. Other implementations are also possible. For example, the modules may be implemented in a set of networked hardware processors or in any other desired way. While each module shown in FIG. 4 may be realized as a separate physical device, other implementations are also possible, including the entire system being implemented as a single physical device, optionally together with an imaging device, such as an x-ray imaging device.

View recognition module 410 can take unannotated chest X-ray images, such as unsorted chest x-rays 405, as inputs. In some embodiments, view recognition module 410 may be composed of a series of convolution blocks with interconnecting residual connections. Each of the convolution blocks may contain convolution layers, pooling layers, and activation layers. View recognition module 410 may be configured to determine the orientations/views of the chest x-ray images and sort chest x-ray images into frontal and lateral view pipelines. Thus, the output of view recognition module 410 may be frontal chest x-rays 415a in a first pipeline and lateral chest x-rays 415b in a second pipeline. To meet practical clinical needs, or for other reasons, the system may receive an arbitrary number of images from each view. It is not required in all instances to have images from both views present.

In some embodiments, frontal chest x-rays 415a may be assigned to a first processing path that includes multi-scale localization module 420a and image classification module 425a and lateral chest x-rays 415b may be assigned to a second processing path that includes a multi-scale localization module 420b and lateral chest x-rays 425b multi-scale localization module 420b. In some embodiments, the two processing paths may process frontal chest x-rays 415a and lateral chest x-rays 415b in parallel.

In some embodiments, each of multi-scale localization modules 420a, 420b may employ a regional object detection paradigm that takes view-sorted chest x-rays, frontal chest x-rays 415a or lateral chest x-rays 415b, as inputs, and provides as outputs task-relevant bounding boxes 430. In some embodiments, bounding boxes 430 may identify regions containing findings or diseases, at different scales. A bounding box containing the full image may always be one of the outputs from these localization modules 420a and 420b and may serve as a global representation. Multi-scale location modules 420a and 420b can be learned from provided bounding boxes or masks or self-learned in an unsupervised manner without ground-truth bounding boxes provided.

As shown in FIG. 4, there can be partial parameter sharing between multi-scale localization module 420a and multi-scale localization module 420b.

The images and associated bounding boxes may continue in their respective processing paths to classification modules, e.g., image classification module 425a and image classification module 425b. Thus, multi-scale bounding boxes 230 from the localization modules may be fed to corresponding classification modules in the same processing path. In some embodiments, image classification modules 425a and 425b may be implemented using any designed or existing modern convolutional neural network (CNN) architecture including but not limited to ResNet, DenseNet, InceptionNet, or the like. Outputs of image classification module 425a and image classification module 425b may be a group of feature maps. These feature maps may be aggregated into feature maps 440, whose sizes may depend on the actual choice of CNN in image classification module 425a and image classification module 425b.

As with the localization modules, so also with image classification modules 425a and 425b there can perform partial parameter sharing.

In some embodiments, the modules in the first processing path (e.g., multi-scale location module 420a and image classification module 425a) and the modules in the second processing path (e.g., multi-scale location module 420b and image classification module 425b) may be trained jointly with a joint loss function. Joint training may ensure that the corresponding modules in the two processing paths at least partially share model parameters. The parameter may be jointly adjusted/optimized during training to minimize the joint loss function. In some embodiments, the joint loss function may be a weighted or unweighted sum of losses derived from the individual processing paths.

The joint prediction module 450 can take the aggregated feature maps 440 provided as outputs from the classification modules and can output diseases/findings probabilities 460. The joint prediction module 450 can be designed such that the input dimensions are dynamic. This design may assist in a clinical environment, as it may avoid a necessity for the patient to undergo a fixed number of x-ray scans.

Figure 5:
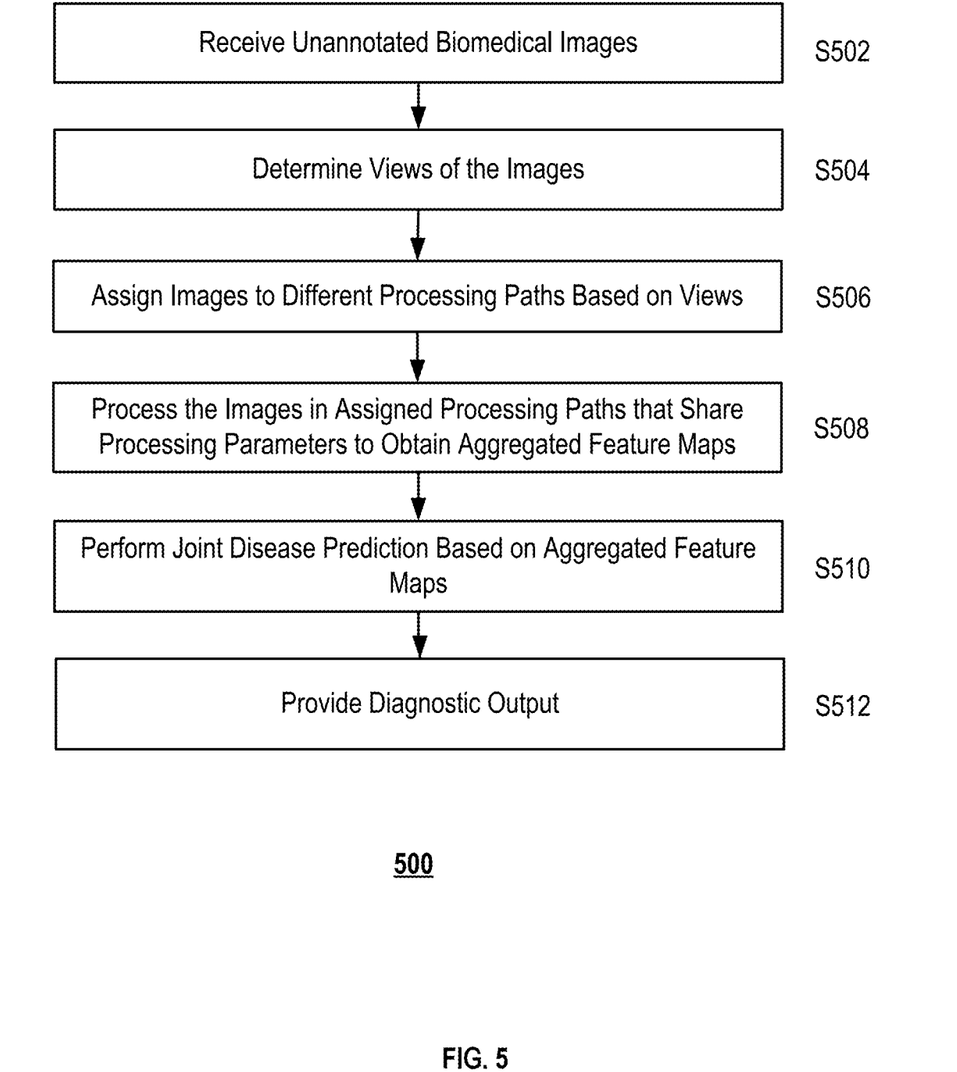
FIG. 5 is a flowchart of an example method 500 for medical diagnostic image analysis, according to certain embodiments of the disclosure.

FIG. 5 is a flowchart of an example method 500 for medical diagnostic image analysis, according to embodiments of the disclosure. As shown in FIG. 5, method 500 can begin, at S502, with receiving unannotated biomedical images, such as multiple thoracic x-rays of a single patient. The method can further include, at S504, determining views of the images. For example, processor 308 may execute view recognition module 410 to analyze each received image and determine whether it is a frontal thoracic image or a lateral thoracic image.

The method can also include, at S506, assigning each image of the images to an appropriate processing path based on the determined view. For example, each lateral view image may be assigned to a lateral image processing path, while each frontal view image may be assigned to a frontal image processing path.

The method can further include, at S508, processing the images in assigned processing paths that share processing parameters to obtain aggregated feature maps. In some embodiments, in the lateral image processing path, processor 308 may execute multi-scale localization module 420a to determine bounding boxes in multi-scale and image classification module 425a to generate feature maps. Similarly, in the frontal image processing path, processor 308 may execute multi-scale localization module 420b to determine bounding boxes in multi-scale and image classification module 425b to generate feature maps. Those feature maps generated by the two processing paths are then aggregated, e.g., into feature maps 440.

The aggregated feature maps can be used, at S510, to perform joint disease prediction. In some embodiments, processor 308 may execute joint prediction module 450 to perform the prediction. The joint prediction can also be used for identifying anatomical features and support structures. At S512, method 500 can include providing a diagnostic output.

Figure 6:
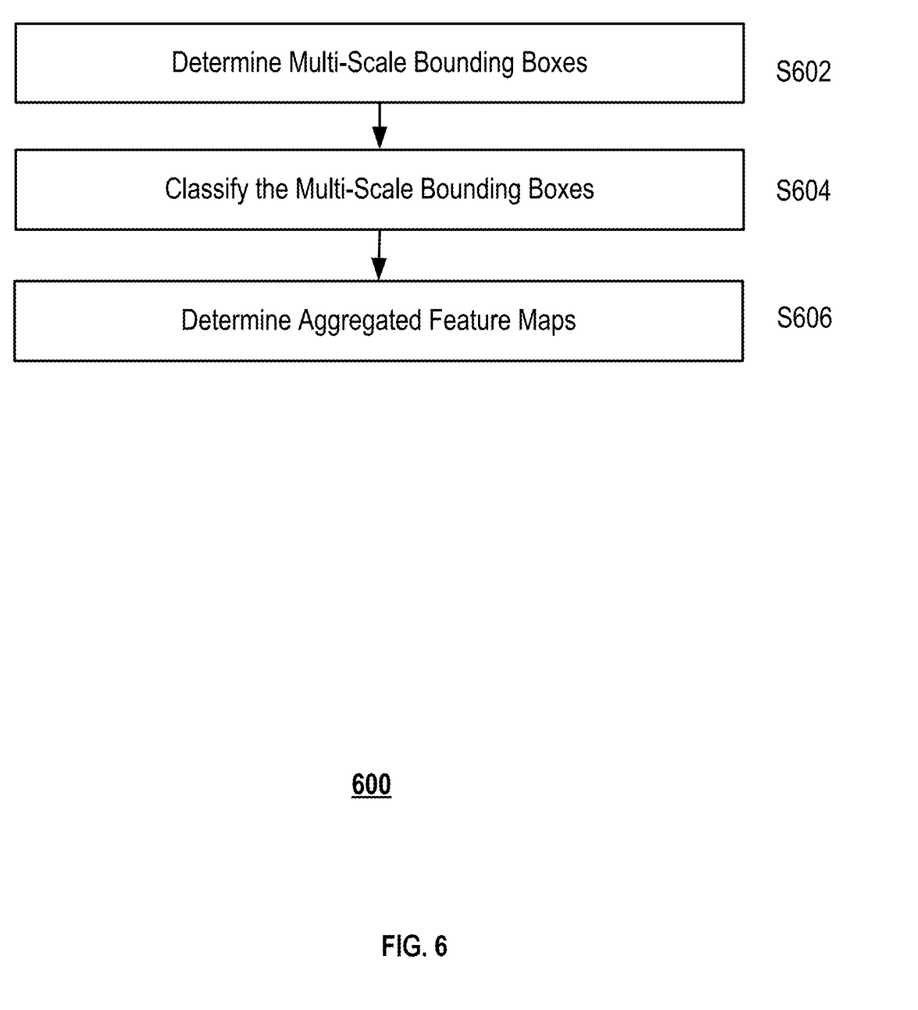
FIG. 6 is a flowchart of another example method 600 performed by an image processing path of FIG. 5, according to embodiments of the disclosure.

FIG. 6 is a flowchart of another example method 600 for to perform step S508 of FIG. 5, according to embodiments of the disclosure. As shown in FIG. 6, at S602, method 600 can include determining multi-scale bounding boxes. This determination can be made with respect to, for example, medical images already sorted by view using the method of FIG. 5. For example, for the lateral images sorted by step S504, processor 308, at step S602, may execute multi-scale localization module 420a to determine bounding boxes in multi-scale. Similarly, for the frontal images, processor 308 may execute multi-scale localization module 420b to determine the bounding boxes in multi-scale at step S602. The bounding boxes determinations for the different views of images may be performed in parallel and in a parameter sharing manner.

Returning to FIG. 6, the method can also include, at S604, classifying the multi-scale bounding boxes. Classifying can include identifying that a given bounding box contains one or more anatomical features, diseases, or other structures or findings. For example, for the lateral images, processor 308, at step S604, may execute image classification module 425a to determine the feature maps. Similarly, for the frontal images, processor 308 may execute image classification module 425b to determine the feature maps at step S604. The feature map determinations for the different views of images may also be performed in parallel and in a parameter sharing manner. The method can further include determining aggregated features maps, at S606. Method 600 can proceed further, for example as illustrated at S510 and following in FIG. 5.

According to certain embodiments, a system for biomedical image analysis may include a communication interface configured to receive a plurality of unannotated biomedical images, the biomedical images including a first image and a second image being acquired in a pair by an image acquisition device. The system can also include at least one processor. The at least one processor can be configured to determine that the first image is in a first view and the second image is in a second view. The at least one processor can also be configured to assign the first image of the plurality of unannotated biomedical images to a first processing path comprising a first set of processing modules designed for the first orientation. The at least one processor can further be configured to assign the second image of the plurality of unannotated biomedical images to a second processing path comprising a second set of processing modules designed for the second view. The at least one processor can additionally be configured to process the first image in the first processing path in parallel with processing the second image in the second processing path. The first set of processing modules share processing parameters with the second set of processing modules. The at least one processor can also be configured to provide a diagnostic output based on the processing of the first image and the second image.

In some embodiments, the processor may further be configured to, in the first processing path, process the first image using a first multi-scale localization module to determine a first set of multi-scale bounding boxes. The processor may also be configured to, in the second processing path, process the second image using a second multi-scale localization module to determine a second set of multi-scale bounding boxes. The first multi-scale localization module and the second multi-scale localization module may share a first subset of the processing parameters.

In some embodiments, the at least one processor may further be configured to, in the first processing path, process the first set of multi-scale bounding boxes using a first image classification module to determine at least one first feature map. The processor may additionally be configured to, in the second processing path, process the second set of multi-scale bounding boxes using a second image classification module to determine at least one second feature map. The processor may also be configured to aggregate the first feature map and the second feature map. The first image classification module and the second image classification module may share a second subset of the processing parameters.

In some embodiments, the at least one processor may further be configured to perform a joint disease prediction based on the aggregated feature maps.

In some embodiments, the at least one processor may further be configured to provide the diagnostic output based on the joint disease prediction and further based on the first set of multi-scale bounding boxes and the second set of multi-scale bounding boxes.

In some embodiments, the diagnostic output may include a two-dimensional or three-dimensional image. The two-dimensional or three-dimensional image may have an area or volume tagged with a human-readable representation of the joint disease prediction.

In some embodiments, the at least one processor may be configured to determine the first view and the second view using a series of convolution blocks with inter-connecting residual connections.

In some embodiments, the first set of processing modules in the first processing path and the second set of processing modules in the second processing path may be trained jointly with a joint loss function.

In some embodiments, the diagnostic output may include at least one of an identification of a thoracic disease, an anatomical structure, or a support device.

In some embodiments, the unannotated biomedical images may include unannotated chest x-ray images.

In some embodiments, the first view may be a frontal view and the second view may be a lateral view.

According to certain embodiments, a method for biomedical image analysis may include receiving, at a communication interface, a plurality of unannotated biomedical images, the biomedical images including a first image and a second image being acquired in a pair by an image acquisition device. The method may include determining, by at least one processor, that the first image is in a first view and the second image is in a second view. The method may also include assigning, by the at least one processor, the first image of the plurality of unannotated biomedical images to a first processing path comprising a first set of processing modules designed for the first orientation. The method may further include assigning, by the at least one processor, the second image of the plurality of unannotated biomedical images to a second processing path comprising a second set of processing modules designed for the second view. The method may additionally include processing, by the at least one processor, the first image in the first processing path in parallel with processing the second image in the second processing path. The first set of processing modules may share processing parameters with the second set of processing modules. The method may also include providing, by the at least one processor, a diagnostic output based on the processing of the first image and the second image.

In some embodiments, the method may include processing, in the first processing path, the first image using a first multi-scale localization module to determine a first set of multi-scale bounding boxes. The method may also include processing, in the second processing path, the second image using a second multi-scale localization module to determine a second set of multi-scale bounding boxes. The first multi-scale localization module and the second multi-scale localization module may share a first subset of the processing parameters.

In some embodiments, the method may include processing, in the first processing path, the first set of multi-scale bounding boxes using a first image classification module to determine at least one first feature map. The method may also include processing, in the second processing path, the second set of multi-scale bounding boxes using a second image classification module to determine at least one second feature map. The method may further include aggregating, by the least the one processor, the first feature map and the second feature map. The first image classification module and the second image classification module may share a second subset of the processing parameters.

In some embodiments, the method may include performing, by the at least one processor, a joint disease prediction based on the aggregated feature maps.

In some embodiments, the method may include providing, by the at least one processor, the diagnostic output based on the joint disease prediction and further based on the first set of multi-scale bounding boxes and the second set of multi-scale bounding boxes.

In some embodiments, the diagnostic output may include a two-dimensional or three-dimensional image. The two-dimensional or three-dimensional image may have an area or volume tagged with a human-readable representation of the joint disease prediction.

In some embodiments, the determining the first view and the second view may include using a series of convolution blocks with inter-connecting residual connections.

In some embodiments, the first set of processing modules in the first processing path and the second set of processing modules in the second processing path may be trained jointly with a joint loss function.

According to certain embodiments, a non-transitory computer-readable medium may have a computer program stored thereon. The computer program, when executed by at least one processor, may perform a method for biomedical image analysis. For example, any of the above-described methods may be performed in this way.

In some embodiments, the computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for biomedical image analysis, comprising:
a communication interface configured to receive a plurality of unannotated biomedical images, the biomedical images including a first image and a second image being acquired in a pair by an image acquisition device; and
at least one processor, configured to:
determine that the first image is in a first view and the second image is in a second view;
process the first image of the plurality of unannotated biomedical images in a first processing path comprising a first set of processing modules designed for the first view, wherein the first set of processing modules comprises a first multi-scale localization learning model to determine a first set of multi-scale bounding boxes identifying regions of interest in different scales:
process the second image of the plurality of unannotated biomedical images in a second processing path comprising a second set of processing modules for the second view, wherein the second set of processing modules comprises a second multi-scale localization learning model to determine a second set of multi-scale bounding boxes in different scales, wherein the first multi-scale localization learning model and the second multi-scale localization learning model are jointly trained by jointly adjusting a first subset of model parameters shared by the first multi-scale localization learning model and the second multi-scale localization learning model; and provide a diagnostic output based on the processing of the first image and the second image.

2. The system of claim 1, wherein the at least one processor is further configured to:
in the first processing path, process the first set of multi-scale bounding boxes using a first image classification learning model to determine at least one first feature map; and
in the second processing path, process the second set of multi-scale bounding boxes using a second image classification learning model to determine at least one second feature map; and
aggregate the first feature map and the second feature map,
wherein the first image classification learning model and the second image classification learning model share a second subset of the model parameters.

3. The system of claim 1, wherein the at least one processor is configured to determine the first view and the second view using a series of convolution blocks with inter-connecting residual connections trained to classify the biomedical images into the first view and the second view according to orientations of the biomedical images.

4. The system of claim 1, wherein the diagnostic output comprises at least one of an identification of a thoracic disease, an anatomical structure, or a support device.

5. The system of claim 1, wherein the unannotated biomedical images comprise unannotated chest x-ray images.

6. The system of claim 1, wherein the first view is a frontal view and the second view is a lateral view.

7. The system of claim 2, wherein the at east one processor is further configured to:
a joint disease prediction based on the aggregated feature maps.

8. The system of claim 7, wherein the at least one processor s further configured to:
determine a disease probability based on the joint disease prediction; and
determine the diagnostic output based on the disease probability and further based on the first set of multi-scale bounding boxes and the second set of multi-scale bounding boxes.

9. The system of claim 7, wherein the diagnostic output comprises a two-dimensional or three-dimensional image, wherein the two-dimensional or three-dimensional image has an area or volume tagged with a human-readable representation of the joint disease prediction.

10. A method for biomedical image analysis, comprising:
receiving, at a communication interface, a plurality of unannotated biomedical images, the biomedical images including a first image and a second image being acquired in a pair by an image acquisition device;
determining, by at least one processor, that the first image is in a first view and the second image is in a second view;
processing, by the at least one processor, the first image of the plurality of unannotated biomedical images in a first processing path comprising a first set of processing modules designed for the first view, wherein the first set of processing modules comprises a first multi-scale localization learning model to determine a first set of multi-scale bounding boxes identifying regions of interest in different scales;
processing, by the at least one processor, the second image of the plurality of unannotated biomedical images in a second processing path comprising a second set of processing modules for the second view, wherein the second set of processing modules comprises a second multi-scale localization learning model to determine a second set of multi-scale bounding boxes in different scales, wherein the first multi-scale localization learning model and the second multi-scale localization learning model are jointly trained by jointly adjusting a first subset of model parameters shared by the first multi-scale localization learning model and the second multi-scale localization learning model; and
providing, by the at least one processor, a diagnostic output based on the processing of the first image and the second image.

11. The method of claim 10, further comprising:
processing, in the first processing path, the first set of multi-scale bounding boxes using a first image classification learning model to determine at least one first feature map; and
processing, in the second processing path, the second set of multi-scale bounding boxes using a second image classification learning model to determine at least one second feature map; and
aggregating, by the least the one processor, the first feature map and the second feature map,
wherein the first image classification learning model and the second image classification learning model share a second subset of the model parameters.

12. The method of claim 10, wherein the determining the first view and the second view comprises using a series of convolution blocks with inter-connecting residual connections trained to classify the biomedical images into the first view and the second view according to orientations of the biomedical images.

13. The method of claim 11, further comprising:
performing, by the at least one processor, a joint disease prediction based on the aggregated feature maps.

14. The method of claim 13, further comprising:
determining a disease probability based on the joint disease prediction; and
determining, by the at least one processor, the diagnostic output based on the disease probability and further based on the first set of multi-scale bounding boxes and the second set of multi-scale bounding boxes.

15. The method of claim 13, wherein the diagnostic output comprises a two-dimensional or three-dimensional image, wherein the two-dimensional or three-dimensional image has an area or volume tagged with a human-readable representation of the joint disease prediction.

16. A non-transitory computer-readable medium having a computer program stored thereon, wherein the computer program, when executed by at least one processor, performs a method for biomedical image analysis, the method comprising:
receiving a plurality of unannotated biomedical images, the biomedical images including a first image and a second image being acquired in a pair by an image acquisition device; and
determining that the first image is in a first view and the second image is in a second view;
processing the first image of the plurality of unannotated biomedical images in a first processing path comprising a first set of processing modules designed for the first view, wherein the first set of processing modules comprises a first multi-scale localization learning model to determine a first set of multi-scale bounding boxes identifying regions of interest in different scales;

processing the second image of the plurality of unannotated biomedical images in a second processing path comprising a second set of processing modules for the second view, wherein the second set of processing modules comprises a second multi-scale localization learning model to determine a second set of multi-scale bounding boxes in different scales, wherein the first multi-scale localization learning model and the second multi-scale localization learning model are jointly trained by jointly adjusting a first subset of model parameters shared by the first multi-scale localization learning model and the second multi-scale localization learning model; and providing a diagnostic output based on the processing of the first image and the second image.

* * * * *